United States Patent
Pfluger

[15] 3,660,066
[45] May 2, 1972

[54] PROCESS AND APPARATUS FOR THE CONTINUOUS MANUFACTURE OF PROFILED GLASS BARS

[72] Inventor: Rudolf Pfluger, Baden, Austria

[73] Assignee: Rubo Vertriebsgesellschaft M.B.H., Wien, Austria

[22] Filed: Oct. 30, 1962

[21] Appl. No.: 872,513

[52] U.S. Cl. ..............................65/94, 65/101, 65/106, 65/185, 65/255
[51] Int. Cl. ......................................................C03b 13/06
[58] Field of Search................65/93, 94, 101, 106, 107, 185, 65/186, 253, 254, 255, 104, 103, 182 A, 273, 275; 18/10

[56] References Cited

UNITED STATES PATENTS

| | | |
|---|---|---|
| 3,226,219 | 12/1965 | Jamnik..................................65/185 X |
| 3,248,198 | 4/1966 | Jamnik et al..........................65/253 X |
| 3,457,057 | 7/1969 | Gardon................................65/119 X |

*Primary Examiner*—Arthur D. Kellogg
*Attorney*—Karl F. Ross

[57] ABSTRACT

A process for rolling profiled glass bars and an apparatus for this purpose whereby a horizontal roller arrangement with at least one cylindrical roll surface and a pair of lateral roller arrangements, each with a respective roll surface contact the glass ribbon to deform the latter into the desire profile. Means is provided for driving the outer roll arrangements at 0.5 to 1.5 percent higher peripheral speeds than the central roll arrangement.

6 Claims, 8 Drawing Figures

PATENTED MAY 2 1972
3,660,066
SHEET 1 OF 2
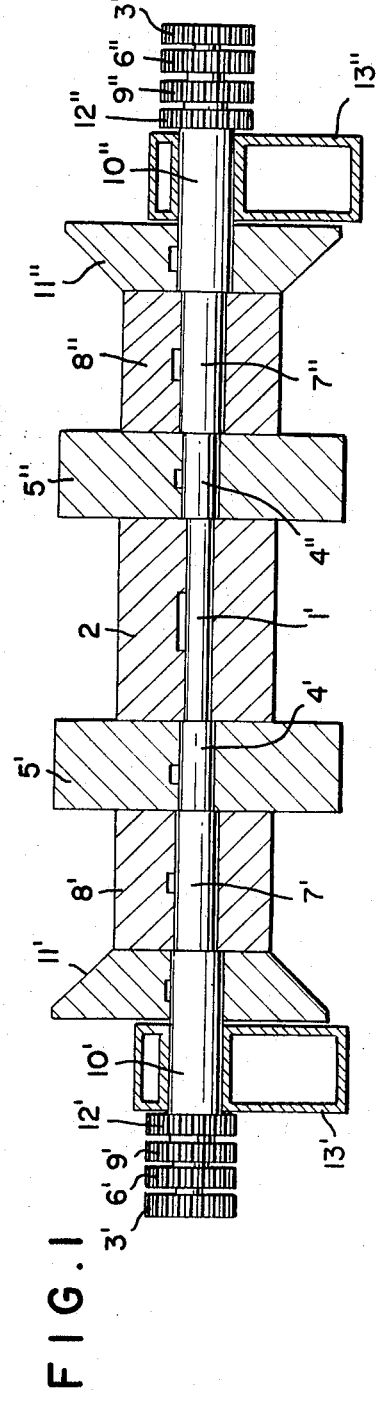
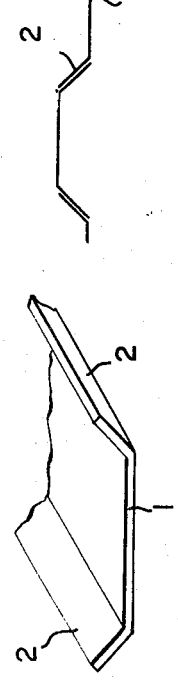
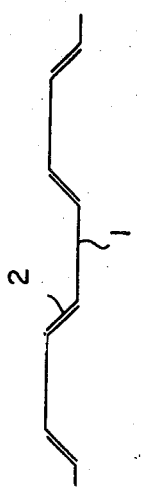
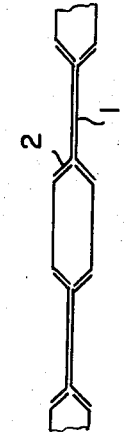
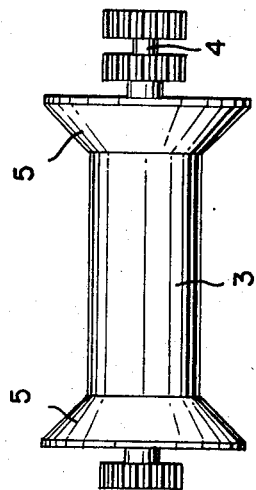
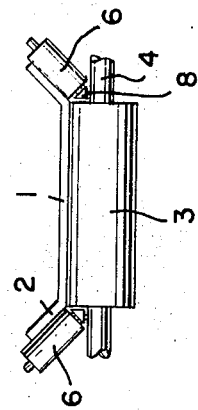
RUDOLF PFLUGER
INVENTOR.
BY
Karl G. Ross
ATTORNEY

RUDOLF PFLUGER
*INVENTOR.*

BY
*Karl F. Ross*
ATTORNEY

PROCESS AND APPARATUS FOR THE CONTINUOUS MANUFACTURE OF PROFILED GLASS BARS

FIELD OF THE INVENTION

This invention relates to a process and apparatus for the continuous manufacture of profiled glass bars by a movement of a plastically deformable flat glass ribbon on a roller bed having rollers which have different inclinations and different diameters.

BACKGROUND OF THE INVENTION

It is known to guide flat glass ribbons in a plastic condition into a roller bed, which comprises profiled rollers or rollers at different inclinations, which rollers are arranged to define a profile. During its movement on the roller bed which defines a profile, the plastic flat glass ribbon is shaped to conform to the profile of this roller bed and the final product which is discharged from the shaping apparatus is a profiled glass ribbon, which is stabilized by cooling. An annular roller may be used in this way to form glass cylinders, or rollers having surfaces at right angles to each other may be used to form angle-section bars. Whereas this process is applicable to the formation of bars having simple profiles, difficulties are encountered as soon as profiles are rolled which have different inclinations or a substantial height. It is also difficult to make profiled bars which have side flanges at an angle different from 90°. In such cases, the end product tends to become corrugated. The difficulties are mainly due to the fact that when a single roller is used which has portions having different diameters, the component rollers have different surface velocities so that the feeding of the glass is not uniform throughout the profile. In the outer portions of the glass ribbon to be deformed, sagging of the glass ribbon, which is still plastically deformable and extensible, may occur between the supporting and shaping rollers. As a result, these portions of the ribbon are elongated relative to the middle portion of the glass ribbon so that the outer portions become corrugated. This danger exists mainly when it is desired to impart to the outer portions of the glass ribbon an inclination which differs from an angle of 90° to the middle portion of the glass ribbon.

SUMMARY OF THE INVENTION

These difficulties are eliminated according to the invention in that the rollers run at different speeds. More particularly, it is suggested to impart approximately equal surface velocities to rollers having a horizontal axis and a horizontal top generatrix. The roller bed is divided into different roller areas so that a separate roller is provided for any area in which the roller surface has a different spacing from the central axis of the rollers. When viewed in a section taken at right angles to the direction of movement of the ribbon, the rollers are suitably driven at different speeds. With the aid of a suitable speed-changing transmission, the speed may be selected so that the surface velocity of rollers having a horizontal axis and a horizontal top generatrix is approximately uniform. For rollers having inclined surfaces the means surface velocity of rollers having a horizontal axis and an inclined top generatrix is ash high as or slightly higher than the surface velocity of rollers having a horizontal axis and a horizontal top generatrix. It has been found that with inclined top generatrices which are not unduly long it is sufficient to make the mean surface velocities approximately uniform. When the inclined portion is too long or the surface velocity differential is too high, the inclined top generatrix must be divided and provided on two rollers. To avoid a sagging in the marginal zones, those rollers which are remote from the center of the ribbon are suitably caused to move at a slightly higher surface velocity than the rollers which are closer to the center of the ribbon. More particularly, it is suggested that edge rollers having an inclined top generatrix relative to the plane of the flat glass are caused to move at a higher surface speed than the adjacent rollers, and the shaped and upturned margin of the glass ribbon is subjected to an initial tensile stress. The lead of the surface of the edge rollers is in this case about 0.5–1.5 percent. This lead is sufficient for constantly applying to the marginal zone a tensile stress which prevents a sagging of the marginal portions. This lead must be maintained from one roller unit to the next until the glass ribbon has sufficiently solidified to prevent sagging.

The proposed process may be carried out so that each roller is separately driven and some positive coupling is provided between the different drive systems. Alternatively, at least one driven roller may drive another through the intermediary of a speed-changing transmission. In that case, only one drive is required. The speed-changing transmission controls the other rollers and drives them at the desired speed. The speed-changing gear may advantageously consist of an epicyclic transmission, known per se. A particularly simple design will be effected if the epicyclic transmission is incorporated in the roller and the driving and driven rollers and the epicyclic transmission or transmissions are mounted on one axis. In this case the entire speed-changing transmission can be arranged in he same way in each roller and on a single axis, without need for protruding drive elements, and only one axis is required rather than a plurality of successive axes. Another advantage resides in that the design is the same for each set of rollers.

It is an advantage if the angle between the flanges and the base of the profiled glass bar is 45°. The flanges are no longer parallel. Each flange includes an angle of 90° with the flange on the other side. The profiled glass bar is suitably placed so that the hollow side of one profiled glass bar faces outwardly and the hollow side of the next profiled glass bar faces inwardly. This results in a meandering pattern, which creates a very good architectural effect and virtually precludes a falling of a profiled glass bar from the assembly. Besides, the connecting surface between two profiled glass ribbons is increased. This results in an improved connection between the profiled glass bars and a much better seal at the abutting surfaces, which is particularly important.

In a preferred arrangement, the flanges have the same length and the base is flat. In this case, two glass bars can be placed one beside the other so that the insides and outsides of the bases face each other in alternation. This results in a complete interlock and in a protection of the wall against pressure from either side. The particularly favorable statical properties which are obtained in this way cannot be obtained with profiled glass bars which have flanges that are at an angle of 90° to the base. The sealing properties are also improved.

DESCRIPTION OF THE DRAWING

The invention will be explained more fully with reference to illustrative embodiments, which are shown on the accompanying drawings, but is not restricted to such embodiments.

FIG. 1 is a sectional view showing a roller unit comprising rollers on a single axis, FIG. 5 is a diagrammatic sectional view showing a wall assembled from profiled bars, FIG. 6 a modification of such wall, FIG. 7 a sectional view of a manufacturing conveyor with the arrangement of the rollers for shaping the profile according to the invention, and FIG. 8 is a modification of FIG. 7.

SPECIFIC DESCRIPTION

Figure 3:
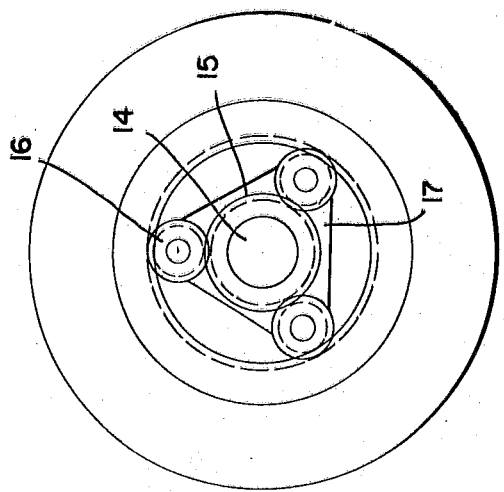

The embodiment shown in FIG. 1 comprises a central shaft 1, which drives a middle roller 2 and is driven by a gear 3. A shaft 4 is rotatably mounted on the central shaft 1 and is driven by a gear 6 and drives two shaping rollers 5′, 5″. The shaping rollers 5′, 5″ are larger in diameter than the middle roller 2. For this reason, the drive is selected so that the shaping rollers rotate at a lower speed than the middle roller and all rollers rotate at the same surface velocity. Instead of shaping rollers having a cornered axial section, rollers having bevelled end faces may also be used, as well as rollers having larger or smaller diameters, as required. Another shaft 7 which is driven by a gear 9 rotates on the shaft 4 and drives two intermediate rollers 8', 8''. In the embodiment shown by way of example, these intermediate rollers have the same diameter as the middle roller 2. Alternatively, they may have another diameter. These rollers will be driven at the same speed as the middle roller. The surface velocity of the previously described roller unit is thus uniform, irrespective of the differences in diameter. A shaft 10 on the shaft 7 drives at each end of the roller unit an edge roller 12, which has a bevelled end face. In the embodiment shown by way of example, these end faces rise at an angle of 45°. The velocity of these edge rollers 12 is selected to provide for a means surface velocity which is about 0.5 percent higher than the surface velocity of the other rollers. As a result, a slight initial tensile stress is imparted to the glass ribbon at its edge so that the ribbon does not sag, in spite of the inclination, and passes in a taut condition from one roller unit to the next. The shaft 10 is mounted at opposite ends of the roller in a bearing bracket 13', 13'', which forms a part of the rigid frame of the roller bed. The roller bed itself comprises a plurality of roller units, which have different profiles so that the glass moving over the different roller units settles into the depressions and conforms to the contour of the rollers. The speed of the individual component rollers may be varied according to the invention.

Figure 2:
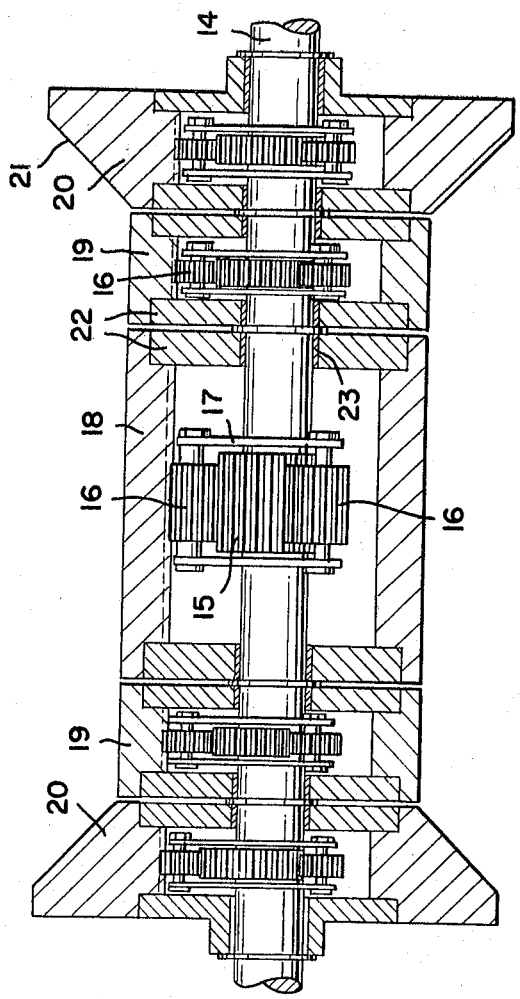
FIG. 2 is a sectional view showing a modification, FIG. 3 a side elevation of FIG. 2, FIG. 4 a perspective view showing a finished profiled bar.

FIG. 2 shows a modification of the drive means for the component rollers. A single central shaft 14 carries a middle roller 18, two intermediate rollers 19', 19'' and two edge rollers 20', 20'' and these rollers are driven by drive gears of different size and planet gears mounted in a holder 16. By means of supporting rings 19 and bearings 20, the individual rollers are rotatably mounted on the central shaft 14 to prevent a lateral tilting of the rollers. The central shaft itself it mounted in roller bed frames, not shown. Upon a rotation of the central shaft 14, the individual rollers are driven by the drive gears 15 and the planet gears 16 at different speeds, as the drive gears 15 and planet gears 16 are of different size. Only a single drive on the central shaft is required. Owing to the provision of the epicyclic transmissions, the various component rollers are automatically driven at different speeds. The central roller has the lowest speed. The intermediate rollers 19 have a slight lead and the edge rollers 20 have a further lead by about 0.5-1.5 percent. As has been described hereinbefore, the inclined end faces 21 impart an initial stress to the glass edge. It will be understood that the epicyclic transmission may also be used with roller units as shown in FIG. 1 or different roller units for W- or M-sections or combinations thereof. In FIG. 4, the profiled bar comprises a flat base and two flanges, which are at an angle of 45° with respect to said base. The length of the profiled bar may be selected as required and the profiled bar may be cut to the required length in usual manner if this is required. The flanges having an inclination of 45° substantially increase the strength, particularly the buckling strength and stiffness and the breakage resistance of the profiled glass product, greatly beyond the corresponding values of profiled glass bars having flanges at right angles to the base and the same height measured at right angles to the flat base. FIG. 5 shows profiled glass bars placed one besides the other. The placing of the profiled glass bars is such that the flanges abut. The recess which is defined by the stop face of the base and the insides of the flanges faces in different direction with adjacent profiled glass bars. The flanges support each other. This imparts an increased strength to the wall and there is no need for special means for connecting the bars other that the usual cementing. The sealing surface is larger than with profiled glass bars having right-angled flanges. FIG. 6 shows a modification of the placing. In this case, two walls as shown in FIG. 6 are placed so that the profiled glass bars face each other in alternation with their outside and inside. This improves the initial support of the bars; the sealing surface is much increased and the insulating properties are also improved.

The profiled glass bar is made from a flat glass ribbon which is shaped in a manner known per se on an overflow glass tank, where the glass ribbon moves, e.g., between two rolls. The flat glass ribbon is then fed to a shaping section, which has middle base rollers 23 having a horizontal top generatrix, and outer rollers having a top generatrix which is inclined to the top generatrix of the base rollers 23. This inclination increases from roller unit to roller unit until the desired inclination of 45° has been obtained. FIGS. 7 and 8 show two different embodiments of roller units in which the outer rollers have a top generatrix at an angle of 45° to the horizontal top generatrix of the middle roller. As is apparent from FIGS. 7 and 8, the middle roller 23 having a horizontal top generatrix is rotatable on an axis and driven at a constant speed. According to FIG. 7, the outer rollers 25 consist of two conical frustums, which are also rotatable on the shaft 24 but are separately driven. The means for driving the roller having a horizontal top generatrix and the means for driving the conical frustums are coupled so that the surface of the conical frustums leads by about 0.5-1.5 percent relative to the surface speed of the middle roller having a horizontal top generatrix. The outer rollers may be driven separately from the middle roller or a speed-changing transmission may be disposed between the outer rollers 25 and the middle roller 23, which has a horizontal top generatrix. FIG. 8 shows a modification of this arrangement. The outer rollers 26 consist here of cylindrical rollers, which are rotatably mounted on a shaft which is at an angle of 45° to the axis 24. The speed of the outer rollers 26 is selected so that their surface speed is higher by about 0.5-1.5 percent than the surface of the middle roller 23 having a horizontal top generatrix. The rollers 26 have a uniform surface velocity throughout their length. The rollers 25 shown in FIG. 7 have an increasing surface velocity so that flange portions which have a larger spacing from the base 1 have a higher initial stress owing to a larger lead of the associated component roller than those portions of the profiled glass ribbon which are nearer to the base. By a suitable variation of the inclination of the shafts and a use of conical frustums having a desired surface inclination, any desired speed variation and distribution of lead in the formation of the flanges may be obtained.

The invention permits of numerous variations within its scope. For instance, other speed-changing transmissions may be used; the individual gears may be coupled according to FIG. 1 and any desired profiles, including round profiles, may be defined by the rollers. With round profiles it may also be suitable to divide the rollers into different sections running at different speeds. Each roller may be separately driven. A coupling may be provided with gears, e.g., by worm gearings, or other types of gearings.

What we claim is:

1. A process for the continuous production of a profiled glass bar, comprising the steps of feeding a plastically deformable glass ribbon along a transport path, engaging a central portion of said ribbon with a central roll surface having a horizontal generatrix and a horizontal axis, and lateral portions of said ribbon with outer roll surfaces having generatrices lying at an angle to the horizontal, and driving said outer roll surfaces at a higher surface speed than that of said central roll surface.

2. The process defined in claim 1, further comprising the step of engaging said ribbon with a pair of intermediate roll surfaces having substantially horizontal generatrices and flanking said central roll surface inwardly of said outer roll surfaces and driving said intermediate roll surfaces with a surface speed intermediate that of said outer roll surfaces and said central roll surfaces.

3. The process defined in claim 2 wherein said intermediate roll surfaces and said central roll surface are coaxial and of substantially equal diameters.

4. The process defined in claim 2 wherein the generatrices of said outer roll surfaces lying in a vertical plane are inclined at angles of about 45° to the horizontal.

5. The process defined in claim 2 wherein the surface speeds of said outer roll surfaces is 0.5 to 1.5 percent greater than the surface speed of said central roll surface.

6. An apparatus for the production of profiled glass bars comprising a central roller arrangement having a central generally cylindrical roller rotatable about a generally horizontal axis and having a substantially horizontal generatrix while being engageable with a central portion of a glass ribbon; a shaft coaxial with and drivingly connected to said central roller; a pair of lateral rollers coaxial with and flanking said central roller and having generatrices inclined to said horizontal generatrix while being engageable with portions of said ribbon outwardly outside said central portion; and gear means connecting said outer rollers with said shaft and dimensioned to drive said outer rollers at a surface speed which is 0.5 to 1.5 percent greater than the surface speed of said central roller.

* * * * *